United States Patent [19]

Hoffman

[11] 4,204,692

[45] May 27, 1980

[54] BLADE HOLDER FOR SABER SAW

[76] Inventor: Simon J. Hoffman, P.O. Box 75821, Los Angeles, Calif. 90075

[21] Appl. No.: 902,198

[22] Filed: May 2, 1978

[51] Int. Cl.² .................................................. B23B 31/22
[52] U.S. Cl. .................................. 279/81; 30/394; 279/71; 279/75
[58] Field of Search ............... 279/71, 72, 75, 81; 30/392, 393, 394, 337

[56] References Cited

U.S. PATENT DOCUMENTS

| 666,507 | 1/1901 | Furbish | 279/81 |
| 3,583,716 | 6/1971 | Daniel, Jr. | 279/81 |
| 3,927,893 | 12/1975 | Dillon et al. | 279/75 |

Primary Examiner—Z. R. Bilinsky
Attorney, Agent, or Firm—John L. McGannon

[57] ABSTRACT

A holder for a blade of a saber saw unit, wherein the blade is of the type provided with a pair of opposed side marginal edges and a notch in at least one side marginal edge near the rear end of the blade. The holder includes a support having a slot for receiving the blade and projecting means shiftably mounted on the support near one side margin of the slot for movement across the same and into the notch of the blade when the blade is in the slot to releasably hold the blade in the slot. Bias means holds the projection means in an operative position in the notch of the blade in the slot. A number of embodiments of the holder are disclosed.

1 Claim, 76 Drawing Figures

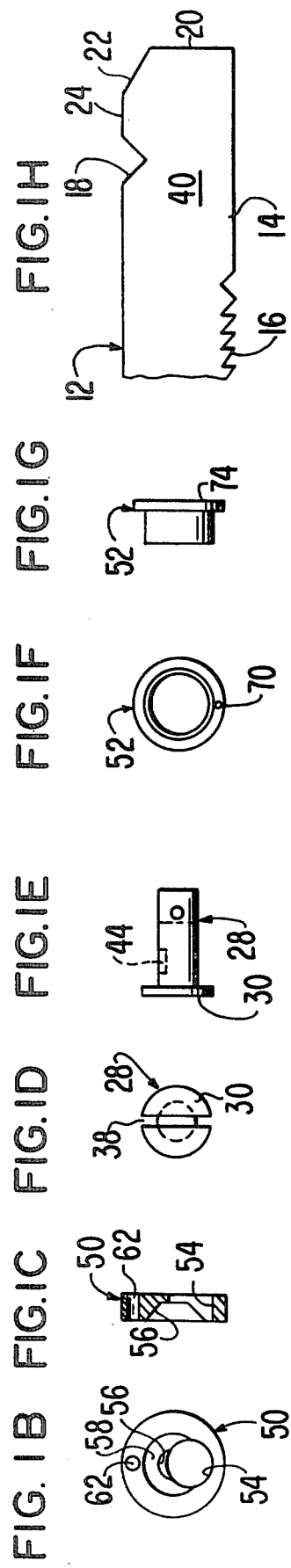
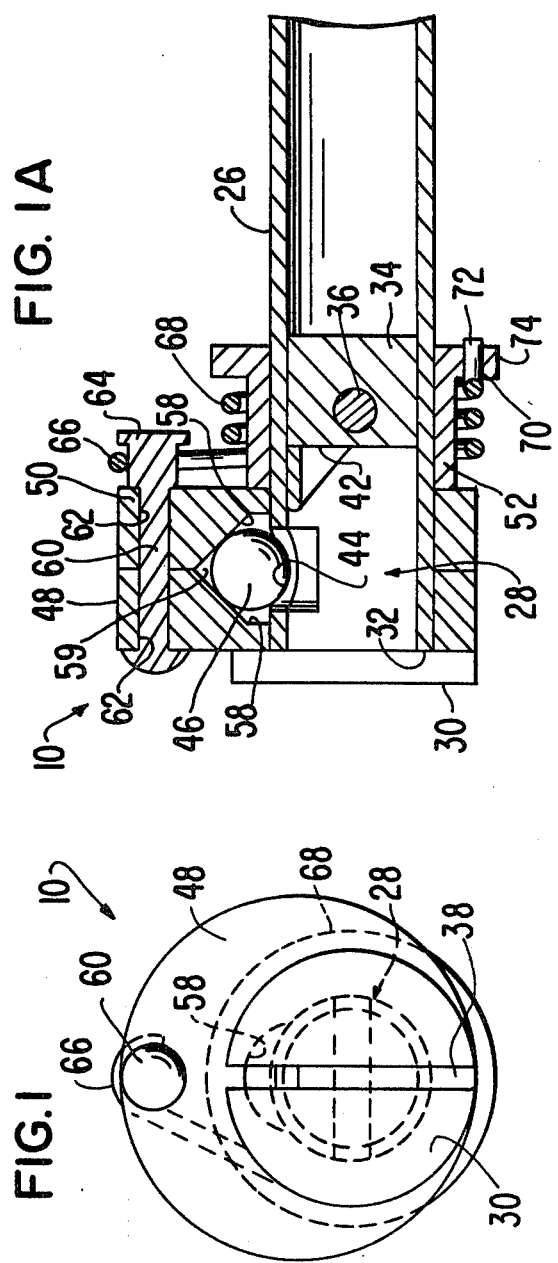

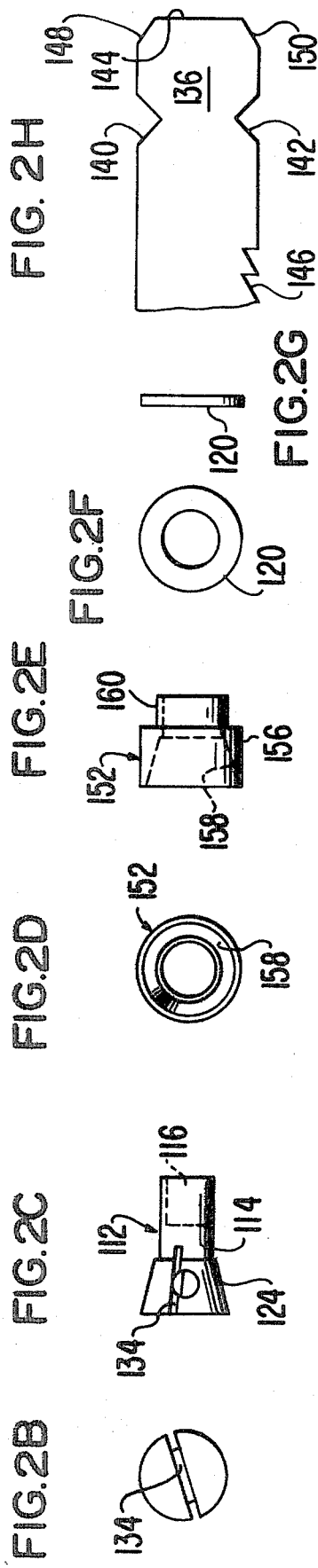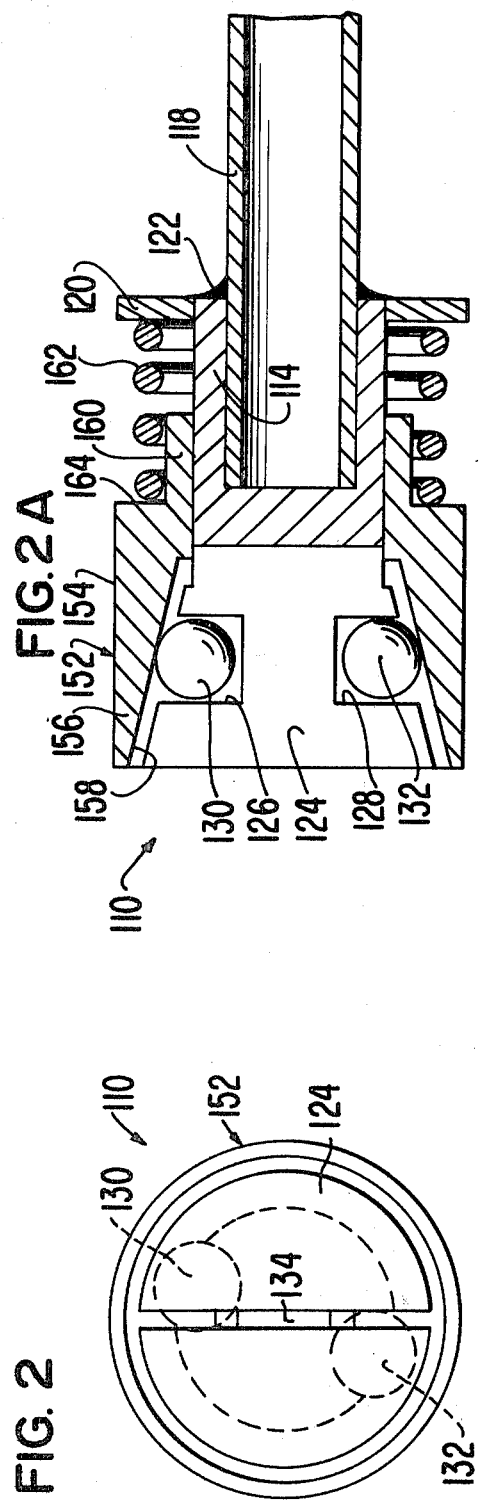

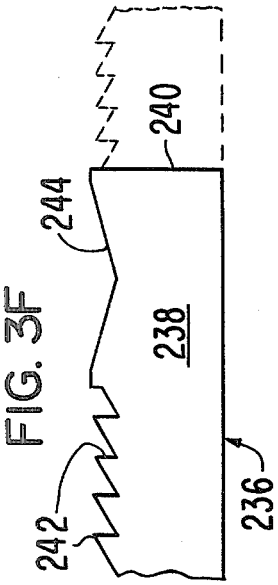
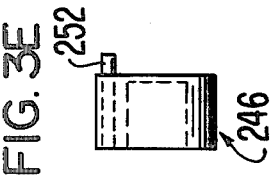
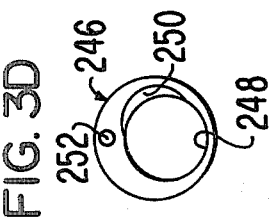
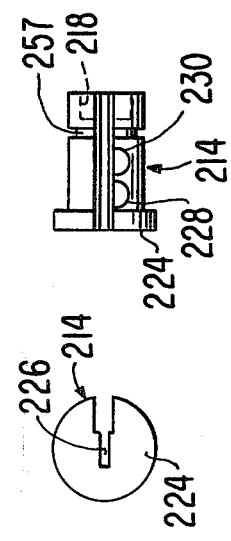
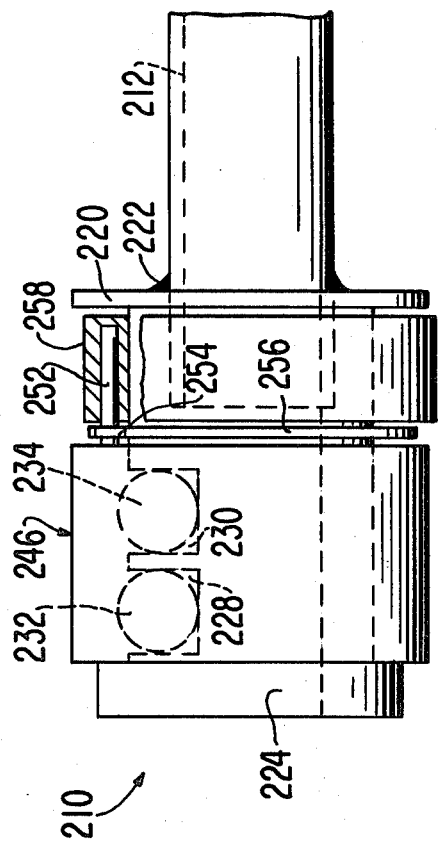
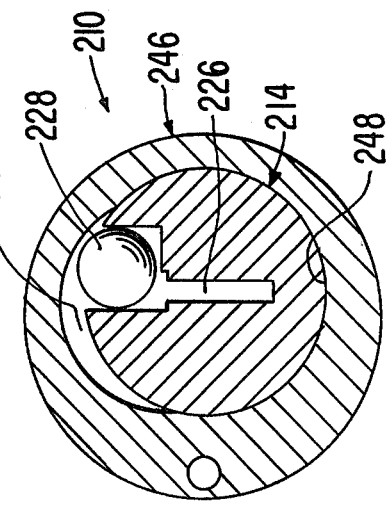

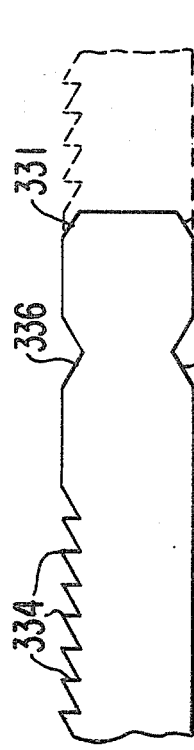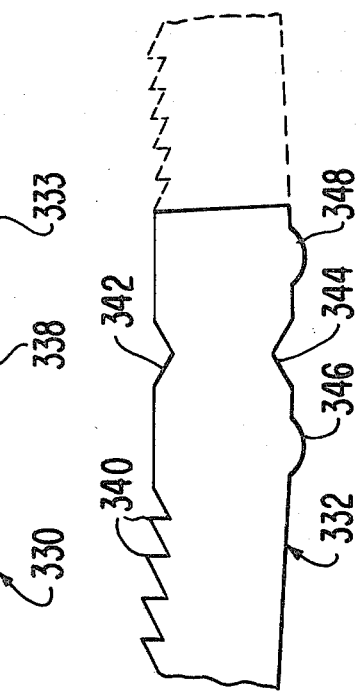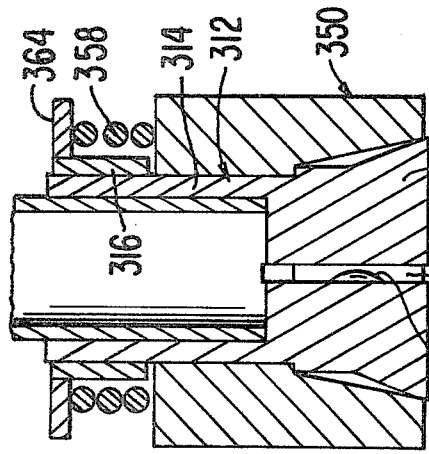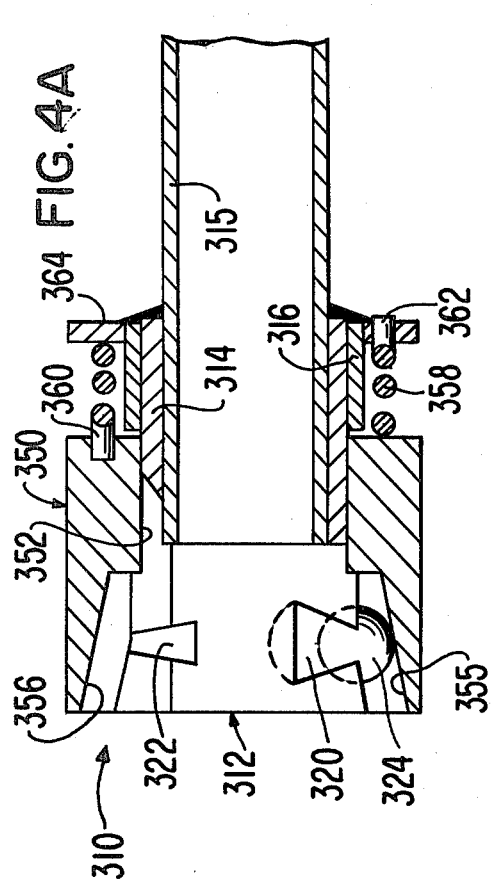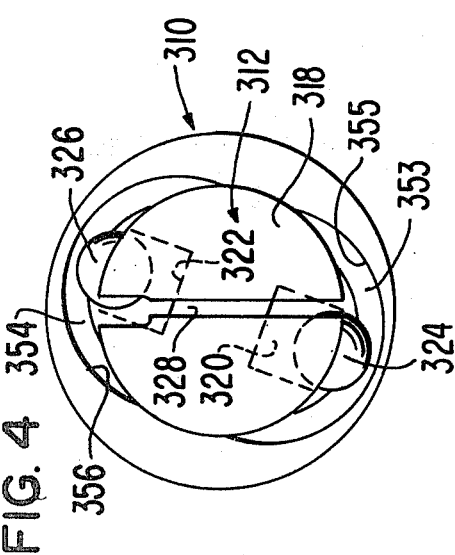

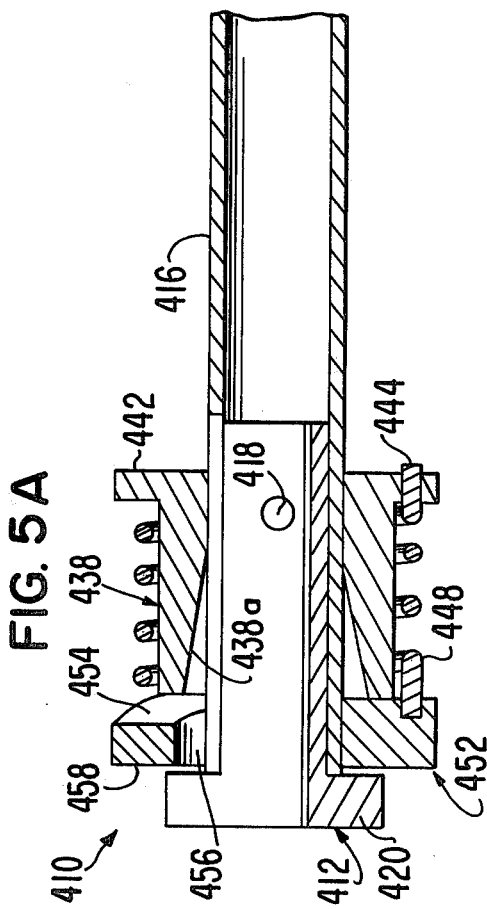

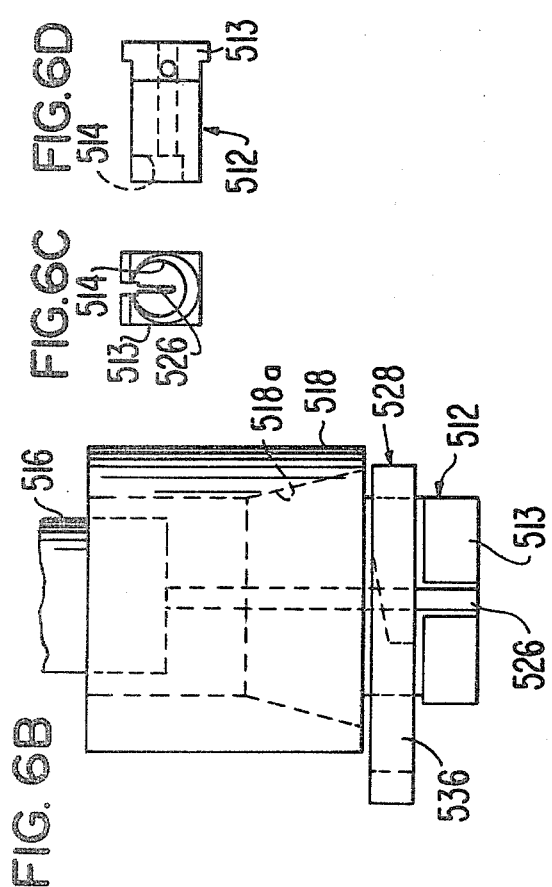
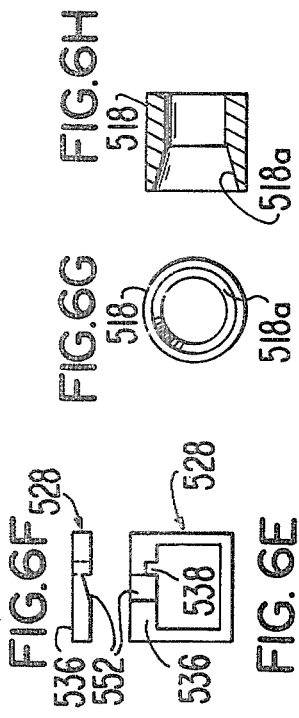
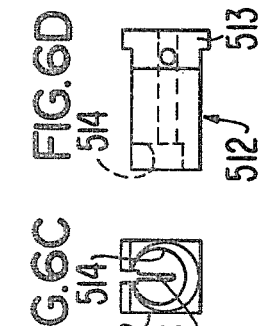
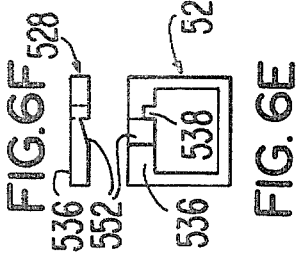
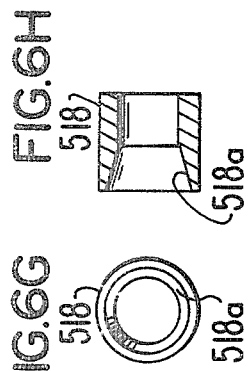
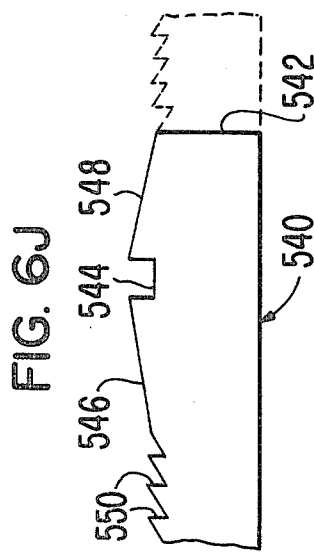
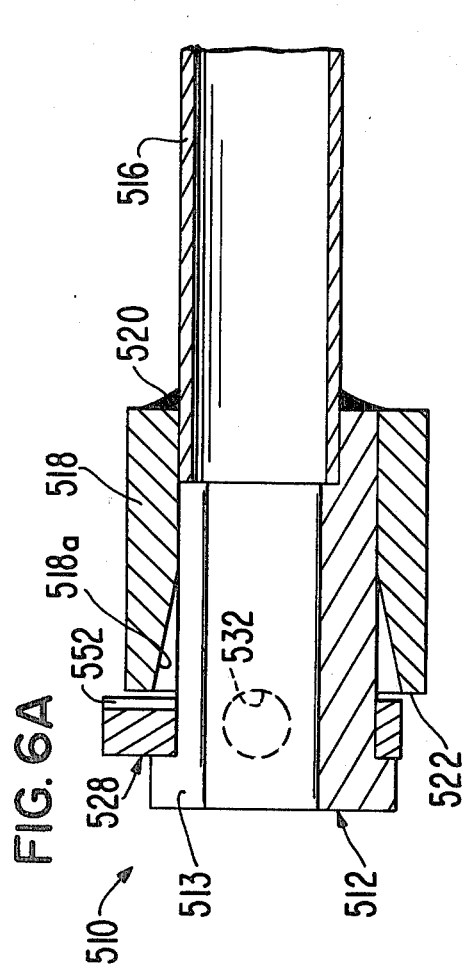
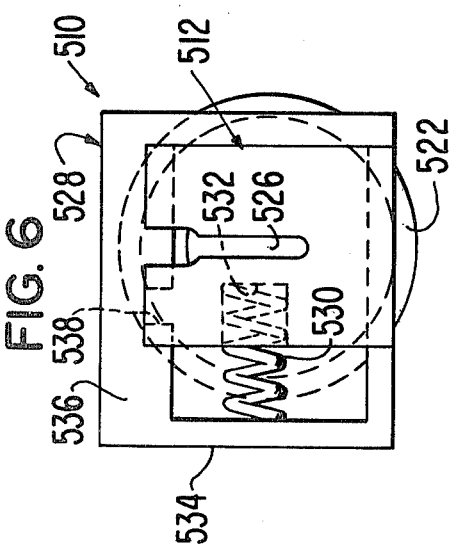

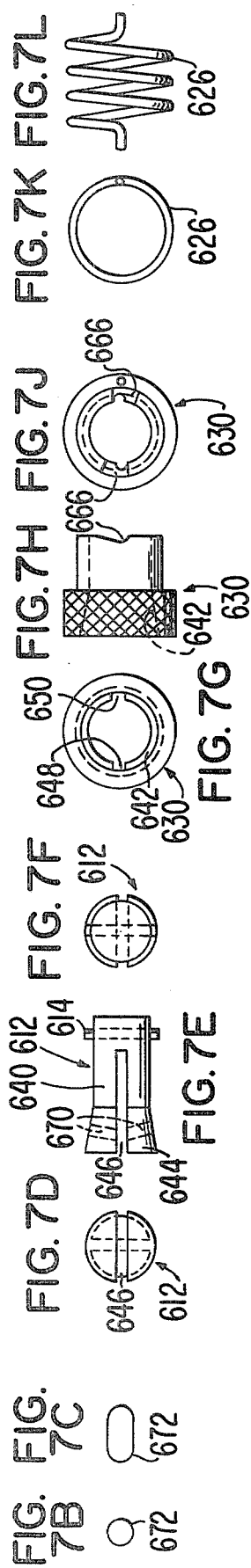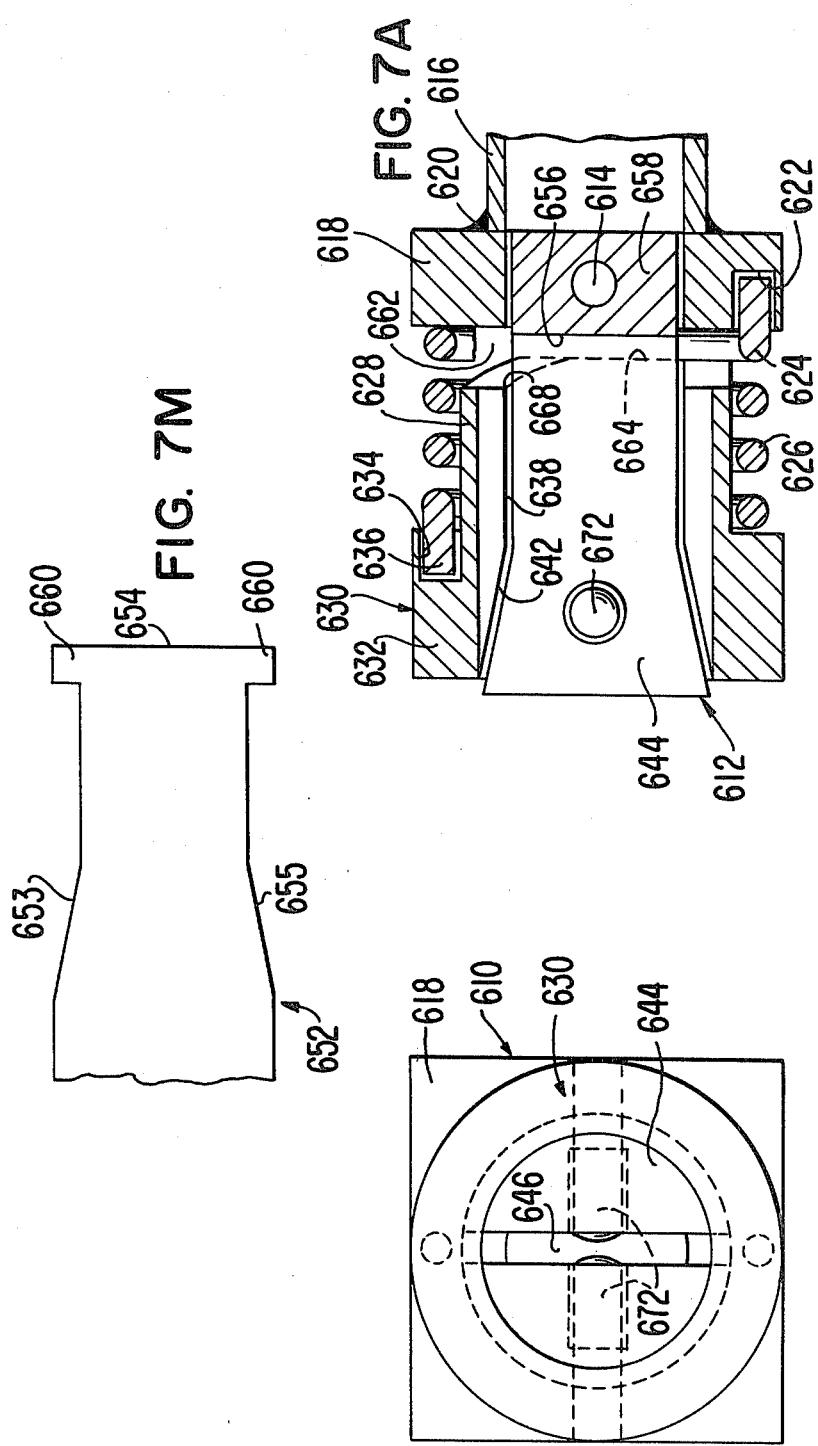

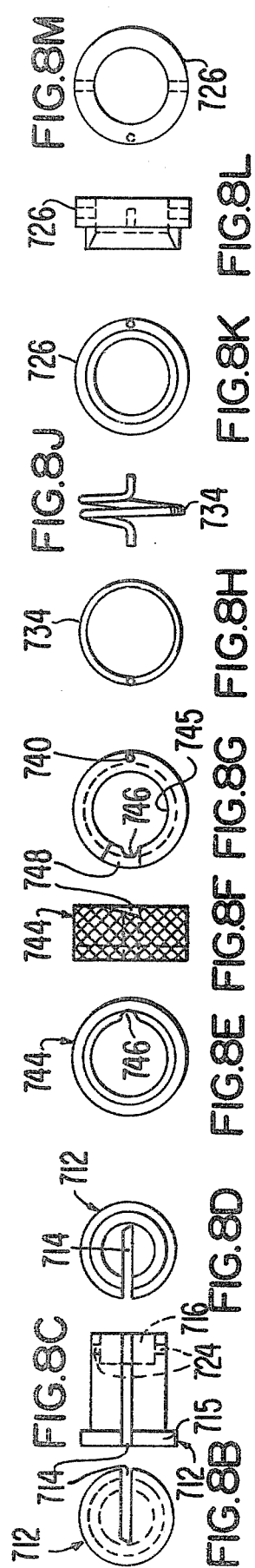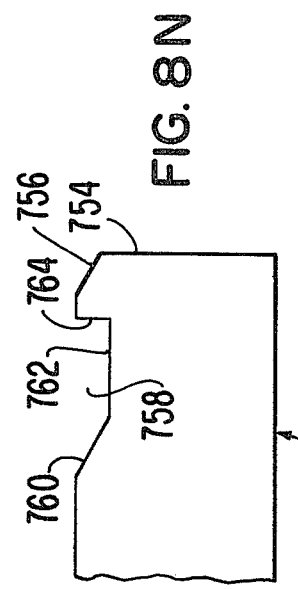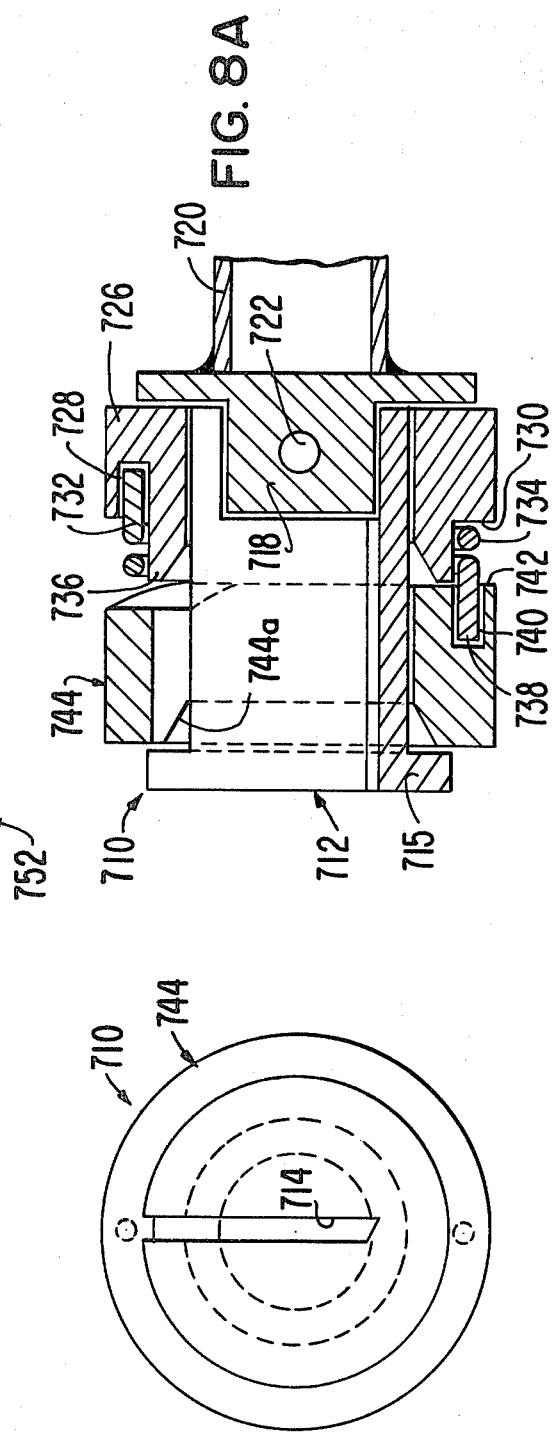

BLADE HOLDER FOR SABER SAW

This invention relates to improvements in the holding of blades in saber saws and, more particularly, to an improved slotted blade holder for a saber saw.

BACKGROUND OF THE INVENTION

A number of devices have been developed over the years for holding saber saw blades to reciprocating mechanisms of saber saws. Currently, the simplest way to do this is to use a set screw carried by the reciprocating part so that the screw can bear against the blade and hold it in a fixed position in a slot of the reciprocating part. The disadvantage of this is that the screw can come loose by constant vibration due to the reciprocatory motion of the blade so that a sawing operating must be interrupted until the screw is again tightened.

Other blade holders used for this purpose have been disclosed in U.S. Pat. Nos. 3,750,283; 3,795,980; 3,823,473; 3,927,893 and 4,020,555. For the most part, the holders of these patents relate to a specific type of blade, one in which one or more holes are drilled through the blade near the rear end thereof for receiving conical detents, balls or the like carried by the holder.

It has become apparent that the construction of the blade is important and that, in some cases, it is desirable that the blade not be drilled or punched so as to maintain a relatively high structural integrity. This would suggest that a recess be placed in the blade only at a side marginal edge thereof. Thus, a need has arisen for an improved holder for a blade having a side marginal edge notch.

SUMMARY OF THE INVENTION

The present invention satisfies the aforesaid need by providing a holder of improved construction which is simple to assemble and to use, yet it is rugged in construction and will positively hold a saber saw blade in a captured condition notwithstanding the intense vibratory action imparted to the blade due to the reciprocatory motion of the saber saws to which the blade is removably attached.

To this end, the present invention includes a holder having a support provided with a slot therein for receiving the rear end of a saber saw blade having a notch in at least one side marginal edge thereof. Shiftably mounted on the support is an element provided with projection means for entering the notch of the blade when the blade is disposed in an operative position in the slot. Finally, means is provided on the support for biasing the element into a position in which the projection means holds the blade in the slot, yet the element can be quickly and easily shifted to a position permitting the clearing of the slot and allowing for the immediate removal of the blade from the slot. A number of embodiments of the holder are disclosed herein to effect this purpose, all of the embodiments including structures which are simple and rugged in construction, yet they require only a simple manual movement of one part on the holder to permit insertion or removal of a blade.

The primary object of this invention is to provide an improved holder for a saber saws wherein the holder is adapted for use with a blade of the type having a notch in at least one side margin edge thereof so that the blade will be positively held in place notwithstanding the vibration due to the reciprocation thereof so as to avoid the shortcomings of the holders of the prior art.

Another object of this invention is to provide a holder of the type described wherein the holder has a support provided with a blade-receiving slot and an element shiftably mounted on the holder and provided with means for entering the notch of the blade when the blade is in the slot so that, when the element is biased into a predetermined direction, the blade is positively held in the slot and cannot move until the element is manually shifted in a direction against the bias force exerted thereon.

Other objects of this invention will become apparent as the following specification progresses, reference being had to the accompanying drawings for illustrations of several embodiments of the invention.

IN THE DRAWINGS

FIG. 1 is a front elevational view of a first embodiment of the holder for a saber saw blade of this invention;

FIG. 1A is a cross-sectional view of the holder of FIG. 1;

FIGS. 1B through 1H are views of various parts of the holder of FIG. 1;

FIG. 1J is a fragmentary, side elevational view of the rear end of a saber saw blade usable with a holder of FIG. 1;

FIG. 2 is a front elevational view of another embodiment of the holder of this invention;

FIG. 2A is a cross-sectional view of the holder of FIG. 2;

FIGS. 2B and 2G are views of various parts of the holder of FIG. 2;

FIG. 2H is a fragmentary, side elevational view of a saber saw blade usable with the holder of FIG. 2;

FIG. 3 is a cross-sectional view of a third embodiment of the holder of this invention;

FIG. 3A is a side elevational view of the holder of FIG. 3;

FIGS. 3B through 3E are views of several parts of the holder of FIG. 3;

FIG. 3F is a fragmentary, side elevational view of a saber saw blade usable with the holder of FIG. 3;

FIG. 4 is a front elevational view of a fourth embodiment of the holder of this invention;

FIG. 4A is a vertical section of the holder of FIG. 4;

FIG. 4B is a horizontal section of the holder of FIG. 4;

FIGS. 4C and 4D are views of two types of blades usable with the holder of FIG. 4;

FIG. 5 is a front elevational view of a fifth embodiment of the holder of this invention;

FIG. 5A is a cross-sectional view of the holder of FIG. 5;

FIGS. 5B through 5G are views of various parts of the holder of FIG. 5;

FIG. 5H is a fragmentary, side elevational view of a saber saw blade for the holder of FIG. 5;

FIG. 6 is a front elevational view of a sixth embodiment of the holder of this invention;

FIG. 6A is a vertical section through the holder of FIG. 6;

FIG. 6B is a top plan view of the holder of FIG. 6;

FIGS. 6C through 6H are views of several parts of the holder of FIG. 1;

FIG. 6J is a fragmentary, side elevational view of the blade for use with the holder of FIG. 1;

FIG. 7 is a front elevational view of another embodiment of the holder;

FIG. A is a cross-sectional view of the holder of FIG. 7;

FIGS. 7B through 7L are views of several parts of the holder of FIG. 7;

FIG. 7M is a fragmentary, side elevational view of the blade used with the holder of FIG. 7;

FIG. 8 is a front elevational view of another embodiment of the holder;

FIG. 8 is a cross-sectional view of the holder of FIG. 8;

FIGS. 8B through 8M are views of several parts of the holder of FIG. 8; and

FIG. 8N is a fragmentary, side elevational view of the blade usable with the holder of FIG. 8.

The first embodiment of the holder of this invention is broadly denoted by the numeral 10 and is adapted to be used with a saber saw blade 12 of the type shown in FIG. 1J. Blade 12 has a body 14 provided with teeth 16 on one side marginal edge thereof and a V-shaped notch or recess 18 along the opposite side marginal edge near one end marginal edge 20. An inclined edge 22 extends from side marginal edge 24 to end marginal edge 20.

Holder 10 includes a slotted support member connected to a tubular barrel 26 adapted to be coupled to a reciprocating mechanism, such as a motor-driven, hand-held actuator of a saber saw. Member 28 is telescopically received within barrel 26 and is provided with an end disk or plate 30 for engaging the end face 32 of barrel 26. Member 28 has a solid rear end part 34 which is secured by a pin 36 to barrel 26, the latter having aligned holes (not shown) for receiving the ends of pin 36.

As shown in FIG. 1E, member 28 has a slot 38 extending therein to permit the rear end portion 40 of blade 12 to be inserted into member 28 far enough so that end marginal edge 20 of blade 12 abuts the flat, front face 42 (FIG. 1A) of rear end part 34. Member 28 has a recess 44 formed in the sidewall in communication with slot 38 for receiving a portion of a ball 46 in a manner to be described.

A pair of cam elements 48 and 50 are rotatably mounted as a unit on barrel 26 between disk 30 and a bushing 52, bushing 52 being secured, such as by pin 36, to barrel 26. Each of elements 48 and 50 is substantially identical with each other and, as shown in FIGS. 1C and 1D, each element is provided with a first, cylindrical bore 54 therethrough for permitting the element to be rotatably mounted on barrel 26. A countersunk bore 56 has an axis which is offset from the axis of bore 54 as shown in FIG. 1D and bore 56 defines a beveled cam surface 58 for engaging ball 46 in the manner shown in FIG. 1A when the ball is captured and disposed in the transversely triangular space 59 (FIG. 1A) defined by mating, opposed cam surfaces 58. To allow for this, elements 48 and 50 are arranged on barrel 26 so that cam surfaces 58 face each other. The elements are held in abutment by a pin 60 passing through aligned holes 62 in elements 48 and 50, the pin having an extension 64 to which one end 66 of a coil spring 68 is coupled. Spring 68 is wound about bushing 52 and has an opposite end 70 passing through a hole 72 in the flange 74 of the bushing.

FIGS. 1 and 1A show the positions of elements 48 and 50 when they are disposed to permit insertion of the rear portion 40 of blade 12. Normally, they are in positions to the left of the positions of FIG. 1 so that ball 46 will be partially in notch 18 of blade 12 when the blade is in an operative position in slot 38, and the ball will remain in the notch to prevent removal of the blade until elements 48 and 50 are rotated as a unit in a clockwise sense, when viewing FIG. 1, to the FIG. 1 positions thereof to permit the maximum radial outward movement of the ball and thereby movement of the ball out of notch 18, when the blade is manually pulled out of slot 38.

In use, elements 48 and 50 are initially in positions forcing ball 46 into recess 44 of member 28. This is caused by the bias force of spring 68. When it is desired to insert blade 12 in holder 10, elements 48 are 50 are manually grased and rotated in a clockwise sense when viewing FIG. 1, causing the maximum radial part of cam surfaces 58 to become aligned with slot 38, whereupon blade 12 is forced into the slot and inclined edge 22 of blade 12 forces ball 46 upwardly into the position shown in FIG. 1A where it remains until notch 18 becomes aligned therewith. Then, elements 48 and 50 are released, are rotated by the bias force of spring 68 in a counterclockwise sense when viewing FIG. 1, and ball 46 is forced partially into recess 44 and into notch 18, securely holding blade 12 against movement to the left when viewing FIG. 1A. The blade cannot pivot about an axis through the side of the blade since support member 28 prevents this movement. The operation of the blade can then commence by causing reciprocation of barrel 26 a number of times per second by the drive unit mentioned above. Removal of the blade is accomplished by reversing the above procedure.

The second embodiment of the holder of this invention is shown in FIGS. 2 and 2A and is denoted by the numeral 110. Holder 110 includes a slotted support member 112 having a cylindrical part 114 provided with a cylindrical bore 116 at the rear end thereof for receiving the front end of a reciprocal barrel 118, the latter adapted to be coupled to a suitable drive unit, such as a motor-driven, hand-held actuator of a saber saw which causes reciprocation of barrel 118. A washer 120 is secured to the rear end of member 112 and is welded at 122 or otherwise fastened, such as by pin means, to barrel 118 for reciprocation therewith.

Member 112 further has a beveled part 124 integral with part 114 (FIG. 2C), part 124 having a pair of diametrically opposed recesses 126 and 128 for receiving balls 130 and 132, respectively. A slot 134 (FIGS. 2B and 2C) is formed in part 124 and is on a line which is angularly disposed relative to the line interconnecting the centers of balls 130 and 132 in recesses 126 and 128 as shown in FIG. 2. Thus, the balls extend partially across the slot at opposed side margins thereof when they are at the inner ends of their recesses and, when the balls move radially outwardly of part 124, less and less of the balls project across the slot 134, thereby permitting the insertion of the rear end part 136 of a saber saw blade 138 having a pair of opposed V-shaped recesses and aligned notches 140 and 142 in the side marginal edges of the blade for receiving respective balls 130 and 132. Blade 138 has a rear marginal end 144 and a plurality of teeth 146 on a side marginal edge thereof forwardly of the corresponding notch 142. Blade 138 has inclined marginal edges 148 and 150 for engaging respective balls 130 and 132 to facilitate insertion of the blade into slot 134.

A cam element 152 has a cylindrical outer surface 154 on a front part 156 provided with a beveled inner cam surface 158 normally surrounding part 124 of member 112 as shown in FIG. 2A. A part 160 on element 152 is slidably received on cylindrical part 114 of member 112. A coil spring 162 under compression surrounds part 160 and spans a distance between washer 120 and the end face 164 of part 156. When element 152 is in the position in FIG. 2, cam surface 158 biases balls 130 and 132 into their innermost positions in their recesses at which they extend across slot 134 to a maximum.

In use, when it is desired to install blade 138 in holder 110, element 152 is manually forced to the right when viewing FIG. 2A longitudinally of member 112 against the bias force of spring 162. This allows balls 130 and 132 to be moved radially outwardly with respect to their recesses 126 and 128. By inserting the rear end part 136 of blade 138 in slot 134, inclined marginal edges 148 and 150 move the balls radially outwardly so that the blade can be inserted until recesses 140 and 142 are aligned with balls 130 and 132, respectively. Then, element 152 is released, it moves to the left when viewing FIG. 2A, thereby forcing balls 130 and 132 into respective recesses 140 and 142 and into slot 134, thereby keeping the blade in place and preventing it from moving outwardly of the slot 134. Then, barrel 118 can be reciprocated at high speed and a sawing operation can commence. To remove the blade, the foregoing procedure is reversed.

A third embodiment of the holder of this invention is broadly denoted by the numeral 210 and is illustrated in FIGS. 3 and 3A. Holder 210 is adapted to be coupled to a reciprocating barrel 212 adapted to be coupled in any suitable manner to a drive unit, such as a hand-held motor-driven actuator. Motor 210 further includes a slotted support member 214 having a cylindrical part 216 provided with an end bore 218 for telescopically receiving the end of barrel 212. A washer 220 rigid to the end of part 216 is welded at 222 to secure member 214 to barrel 212.

The front end of member 214 has a flange 224 (FIGS. 3B and 3C) and a keyhole-shaped slot 226 therein which extends throughout a major portion of member 214 as shown in FIG. 3. Member 214 also has a pair of axially aligned recesses 228 and 230 on one side thereof for receiving respective balls 232 and 234, recesses 228 and 230 communicating with one side margin of slot 226 as shown in FIG. 3. Recesses 228 and 230 are open at their outer ends so that balls 232 234 can move outwardly of member 214 to permit insertion of a saber saw blade 236 having a rear part 238 provided with a rear end marginal edge 240. Blade 236 also has a plurality of spaced cutting teeth 242 on one side marginal edge thereof and a shallow V-shaped notch 244 on the same marginal edge as teeth 242. FIG. 3F also shows that the blade can be a double-ended or single-ended blade inasmuch as slot 226 extends completely through member 214 and communicates with bore 218 and because barrel 212 is tubular.

An outer cam element 246 has a first bore 248 therethrough for rotatably mounting the element on part 216 of member 214 in the manner shown in FIG. 3. Cam element 246 has a second bore 250 whose axis is offset from the axis of bore 248 as shown in FIG. 3D. Bore 250 presents a cam surface for engaging balls 232 and 234 when cam element 246 is in a position shown in FIG. 3. In this position, the cam surface of bore 250 forces the balls to the left when viewing FIG. 3 and essentially across one side margin of slot 226. Thus, if blade 236 is in the slot, the balls are disposed within notch 244 of the blade to thereby hold the blade against movement outwardly of the slot.

Cam element 246 has a pin 252 extending rearwardly therefrom near the outer periphery thereof. Pin 252 extends through a slot 254 in a snap ring 256 in a groove 258 in part 216. Pin 252 is also coupled to a flat wire torsion spring 258 surrounding the rear end of part 216 and coupled thereto in any suitable manner. Thus, when cam element 246 is rotated in a clockwise sense when viewing FIG. 3, it does so against bias force of spring 258, thus allowing balls 232 and 234 to move outwardly and into bore 250 (FIG. 3), thus essentially opening slot 226 for insertion of the blade 236.

In operation, when it is desired to insert blade 236 in slot 226, cam element 246 is manually rotated in a clockwise sense when viewing FIG. 3. This causes the inner portion of bore 250 to move into radial alignment with balls 232 and 234, thereby allowing the balls to move outwardly of their respective recesses 228 and 230. Then, the rear end of the blade is inserted into slot 226 until notch 244 is aligned with balls 232 and 234, whereupon cam element 246 is released and bias force of spring 258 causes the element to move back into the position shown in FIG. 3 in which balls 232 and 234 are forced into and held in notch 244. Thus, the blade is prevented from movement outwardly of slot 226 and sawing can be performed with the blade. To remove the blade, the foregoing procedure is reversed and the blade is pulled out of the slot.

A fourth embodiment of the holder of this invention is broadly denoted by the numeral 310 and is illustrated in FIGS. 4 and 4A. Holder 310 includes a slotted support member 312 having a cylindrical, tubular part 314 for placement onto a tubular barrel 315 adapted to be coupled to a reciprocating drive unit of the type mentioned above for the other embodiments. Part 314 has a bushing 316 mounted thereon near the rear end thereof, both part 314 and bushing 316 being welded or otherwise fastened to barrel 315.

The front part 318 of member 312 has a pair of diametrically opposed recesses 320 and 322 provided with outer open ends. These recesses have balls 324 and 326, respectively, therein. Part 318 also has a slot 328 extending through the same and the slot is on a line which is at an angle relative to the line connecting the centers of balls 324 and 326 as shown in FIG. 4. Thus, when the balls are near the inner ends of respective recesses 320 and 322, the balls extend across the opposed side margins of slot 328 and are adapted for holding either a blade 330 or a blade 332 in place for sawing operations. For instance, blade 330 has saw teeth 334 in one side marginal edge and a pair of V-shaped notches 336 and 338 on opposed side marginal edges. Blade 332 gas saw teeth 340 on one side marginal edge and a pair of opposed V-shaped notches 342 and 344 on opposed side marginal edges. Inclined rear marginal edges 331 and 333 are on blade 330. A pair of curved projections 346 and 348 are disposed on opposite side of notch 344 as shown in FIG. 4D. Both blades can be single-ended or double-ended. The double-ended features is indicated in dashed lines in FIGS. 4C and 4D.

An element 350 has a first bore 352 therethrough for rotatably receiving part 314 as shown in FIG. 4B. Element 350 has a pair of second bores 353 and 354 near the front end thereof, the axes of bores 353 and 354 being offset relative to the axis of bore 352 so as to present cam surfaces 355 and 356 surrounding recesses 320 and 322.

A coil spring 358 surrounds bushing 316 and has one end 360 coupled with the rear end of element 350 as shown in FIG. 4A. The opposite end 362 of coil spring 358 is received wihin a hole extending through the rear flange 364 of bushing 316.

In use, to insert either blades 330 or 332 into slot 328, element 350 is moved into the full line position thereof shown in FIG. 4 by rotating element 350 in a clockwise sense when viewing FIG. 4. This permits balls 324 and 326 to move outwardly into bores 353 and 354 and either of the blades can then be inserted into the slot 328 until the corresponding pair of notches on the blade are aligned with balls 324 and 326. Then, element 350 is released and the bias force of spring 358 causes it to rotate in a counterclockwise sense when viewing FIG. 4, forcing balls 324 and 326 inwardly and into the blade notches, such as notches 336 and 338 of blade 330.

When inserting blade 330 in the slot and assuming it is a single-ended blade, inclined end margins 331 and 333 of the blade engage the balls and move them outwardly. Similarly, projection 348 of blade 332 does the same purpose for one of the balls. To remove the blade, the above procedure is reversed. Then the blade can be pulled manually outwardly of the slot.

Another embodiment of the holder of the invention is shown in FIGS. 5 and 5A and is broadly denoted by the numeral 410. Holder 410 includes a support member 412 having a cylindrical part 414 for insertion into a barrel 416 adapted to be coupled to a reciprocating drive unit, such as a drive unit of the type described above with respect to the other embodiments. A pin 418 is used to couple part 414 to barrel 416.

A flange 420 engaging the front face of barrel 416 is integral with the front end of part 414 and member 412 has a slot 422 therein as shown in FIGS. 5, 5B and 5C. This slot is to receive the rear end 424 of a saber saw blade 426 having a rear end marginal edge 428, a U-shaped notch or recess 430 and inclined margins 432 and 434 on opposite sides of notch 430. Saw teeth 436 are on a side marginal edge of blade 426.

A fixed element 438 secured to barrel 416 has a first bore 440 for receiving part 414. Element 438 has a rear flange 442 provided with a hole therethrough for receiving one end 444 of a coil spring 446 wound about element 438 whose opposite end 448 is received within a hole 450 (FIG. 5D) of a washer-like element 452 rotatably mounted on part 414 immediately rearwardly of flange 420. Element 452 has a cam surface 454 which normally abuts the annular front face of element 438 in the manner shown in FIG. 5A.

Element 452 has a recess 456 communicating with the central bore 458 thereof (FIG. 5D) and element 452 has its smallest thickness at recess 456, this meaning that cam surface 454 converges toward the front face of element 452 as recess 456 is approached.

In use, when it is desired to insert blade 426 on the holder, element 452 is manually rotated in a counterclockwise sense when viewing FIG. 5 until recess 456 is aligned with slot 422 as shown in FIG. 5. Then, blade 426 can be inserted into slot 422 until notch 430 is aligned with element 452. Then, element 452 is released and the bias force of the spring 446 will cause element 452 to rotate in a clockwise sense when viewing FIG. 5, causing recess 456 to move out of alignment with slot 422, thereby causing element 452 to enter notch 430 of blade 426 until element 452 becomes wedged against the blade. This causes inclined side marginal edge 434 of blade 426 to abut the beveled inner surface 438a of element 438. This will secure the blade to the holder and a sawing operation can commence. To remove the blade, the foregoing procedure is reversed.

A sixth embodiment of the holder of this invention is broadly denoted by the numeral 510 and includes a slotted support member 512 (FIGS. 6C and 6D) which is generally cylindrical, has a square or rectangular front part 513 and also has a rear recess 514 adapted to be telescoped onto the end of a tubular barrel 516, the latter adapted to be coupled in any suitable manner to a reciprocating drive unit of the type described with respect to the other embodiments. A fixed cylindrical member 518 surrounds member 512 and both members 512 and 518 are welded at 520 or otherwise secured to barrel 516 and project forwardly therefrom. Member 518 has a flat front face 522 spaced rearwardly from a rectangular flange 524 on front part 513 of member 512. Member 512 and front part 513 have a blade-receiving slot 526 extending threthrough and open at its normally uppermost end.

A square or rectangular frame 528 (FIGS. 6E and 6F) is disposed in sliding engagement on front part 513 of member 512 between flange 524 and front face 522 of member 518. Frame 528 is biased to the left relative to front part 513 when viewing FIG. 6 by a coil spring 530 under compression, the spring extending into a recess 532 in front part 513 of member 512 and the opposite end of the spring bearing against the adjacent side 534 of frame 528.

The upper, flat crosspiece 536 of frame 528 has a notch 538 formed inwardly from the lower margin thereof as shown in FIG. 6. Crosspiece 536 of frame 528 has a cam surface 552 extending away from notch 538 (FIGS. 6E and 6F) and facing front face 522 of member 518. Notch 538 is adapted to be aligned with slot 526 to permit a blade 540 to be inserted into the holder, blade 540 being either single-ended or double-ended. If single-ended, the blade has a rear margin 542. If double-ended, the blade has additional structure shown in dashed lines in FIG. 6J.

Blade 540 also has a U-shaped notch 544 between a pair of inclined side marginal edges 546 and 548. The blade also has teeth 550 on the side margin corresponding to that of notch 544.

In use, when it is desired to insert the blade in the holder, frame 528 is moved to the right when viewing FIG. 6 against the bias force of spring 530. This causes notch 538 to become aligned with slot 526, whereupon blade 540 can be inserted into the notch until notch 544 is aligned with crosspiece 536. Then, the frame is released and notch 538 moves to the left when viewing FIG. 6, crosspiece 536 moves into notch 544 of blade 540, cam surface 552 is wedged in notch 544, and inclined side marginal edge 548 of the blade abuts beveled surface 518a of member 518, thereby effectively releasably holding the blade in the holder. To remove the blade, the foregoing procedure is reversed.

Another embodiment of the holder of this invention is broadly denoted by the numeral 610 and is illustrated in FIGS. 7 and 7A. Holder 610 includes a slotted support member 612 adapted to be secured by a pin 614 to a tubular barrel 616, the latter adapted to be coupled to a reciprocal drive unit of the type described above with respect to the other embodiments. A washer 618 surrounds the rear end of member 612 and is welded at 620 to barrel 616. Washer 618 has a hole 622 for receiving the rear end 624 of a coil spring 626 surrounding a cylindrical part 628 of a rotatable element 630 whose front flange part 632 has a hole 634 for receiving the front end 636 of the spring.

Element 630 has a cylindrical bore 638 for receiving the cylindrical part 640 (FIG. 7E) of support member 612. Element 630 further has a beveled annular surface 642 for surrounding the beveled forward part 644 of member 612.

Support member 612 is provided with a blade-receiving slot 646 therethrough. Element 630 has a pair of opposed recesses 648 and 650 (FIG. 7G) which are diametrically opposed and removable into alignment with slot 646 to permit a blade 652 to be inserted into the slot until the rear, flat end margin 654 of the blade abuts the flat front face 656 of the rear part 658 of support member 612. The blade also has a pair of rear end projections 660 which are received within the space 662 between the rear face 664 of element 630 and front face 656 of rear part 658. Also, rear face 664 has a pair of diametrically opposed cam surfaces 666 (only one of which is shown in FIG. 7H) which terminate at respective recesses 648 or 650. Thus, the rear end 668 of each of the recesses 648 and 650 is forwardly of the flat rear face 664 of element 630 as shown in FIG. 7A.

Member 612 also has a pair of lateral bores 670 near the front end thereof (FIG. 7A) for receiving respective pins 672 having rounded opposed ends. The pins are disposed in respective bores 670 and are adapted to extend at least partially across slot 646 as shown in FIG. 7 to frictionally engage the opposed sides of blade 652 to assist in holding the same against outward movement relative to the slot. These pins are forced inwardly by the camming action of bevel surface 642 of element 630 when the latter rotates into a position locking the blade in slot 646.

In use, element 630 is rotated so that its recesses 648 and 650 are aligned with slot 646. When this occurs, pins 672 are free to move laterally outwardly of slot 646 and the rear end of blade 652 can then be inserted into the slot until the rear margin 654 of the blade abuts front face 656 of rear part 658 of member 612 (FIG. 7A). Then, element 630 is released and it rotates in a clockwise sense when viewing FIG. 7, causing the cam surfaces 666 to engage the front faces of projections 660 on blade 652, thereby forcing projections 660 against the front face of washer 618 and force inclined side marginal edges 653 and 655 of blade 652 against the beveled inner front surface 642 of element 630, thereby releasably holding the blade in the slot. Also, pins 672 are forced radially inwardly and into frictional engagement with the opposed sides of the blade to assist in holding the same against outward movement relative to slot 646. To remove the blade, the foregoing procedure is reversed.

Another embodiment of the holder of this invention is broadly denoted by the numeral 710 and includes a support member 712 having a slot 714 therethrough and provided with a flange 715 on the front end thereof. The rear end of member 712 has a cylindrical bore 716 for receiving a solid projection 718 on the front end of a reciprocating barrel 720 adapted to be coupled to a drive unit, such as a drive unit of the type described with respect to the above embodiments. A pin 722 couples the rear end of member 712 with projection 718, member 712 having side holes 724 (FIG. 8C) for receiving pin 722.

A fixed sleeve 726 is secured in any suitable manner, such as by welding, to the rear end of member 712 and has a hole 728 in the front face 730 thereof for receiving the rear end 732 of a coil spring 734 surrounding the front projecting portion 736 of sleeve 726.

The front end 738 of coil spring 734 is received within a hole 740 in the rear end face 742 of a rotatable element 744 having a cylindrical bore 745 (FIG. 8G) for rotatably receiving the central part of member 712 as shown in FIG. 8A. Element 744 has a recess 746 therein (FIG. 8G) and a cam surface 748 terminating at recess 746 and extending away therefrom, the rear end of recess 746 being forwardly of the rear end face 742 of element 744.

Slot 714 is adapted to receive the rear end part 750 of a saber saw blade 752 of the type having a rear end margin 754, an inclined rear margin 756 and a notch 758 defined by an inclined front edge 760, a middle longitudinal edge 762 and a perpendicular rear edge 764 as shown in FIG. 8N.

In use, when it is desired to insert the blade in the holder, element 744 is rotated in a counterclockwise sense when viewing FIG. 8 until recess 746 thereof becomes aligned with slot 714. When this occurs, the blade can be inserted into the slot until rear end margin 754 abuts the front flat face of projection 718 (FIG. 8A). Then, element 744 is released and the bias force of spring 734 causes it to rotate in a clockwise sense when viewing FIG. 8, causing element 744 to enter notch 758 and to become wedged against rear edge 764 by virtue of the cam surface 748. Also, inclined front edge 760 of notch 758 abuts beveled inner front surface 744a of element 744. Thus, the blade is held against movement out of slot 714 and a sawing operation can commence. To remove the blade, the foregoing procedure is reversed.

I claim:

1. A holder for a saber saw blade of the type having a pair of opposed side marginal edges and a notch in one of the side marginal edges near the rear end of the blade comprising: a tubular support having an open end; a blade-mounting member inserted in the open end of the support and having a blade-receiving slot extending thereinto, the inner end of the member presenting a blade-engaging face and the side of the member having a recess communicating with the slot, said support having a hole communicating with the recess; means securing the member to the support; a ball movable partially into the hole, the recess and the slot; means including a pair of adjacent, interconnected cam elements rotatably mounted on the support for caging said ball so that the ball can move partially into and out of the notch of said saber saw blade when the blade is in said slot and as the ball extends at least partially through the hole and the recess, each element having a beveled, inner peripheral face, the beveled faces being adjacent to each other to form a cam surface engagable with the ball to force the latter partially into said notch when said elements have been rotated in one direction on said support, said elements being rotatable on said support in the opposite direction to cause the cam surface to be positioned to allow movement of the ball away from the slot and thereby to permit the blade to be inserted into and removed from the slot; and means coupled with the elements for biasing the same in said one direction.

* * * * *